United States Patent [19]

Amano et al.

[11] Patent Number: 4,501,249

[45] Date of Patent: Feb. 26, 1985

[54] FUEL INJECTION CONTROL APPARATUS FOR INTERNAL COMBUSTION ENGINE

[75] Inventors: Matsuo Amano; Shinichi Sakamoto, both of Hitachi; Takeshi Hirayama, Mito; Takao Sasayama, Hitachi, all of Japan

[73] Assignee: Hitachi, Ltd., Tokyo, Japan

[21] Appl. No.: 488,453

[22] Filed: Apr. 25, 1983

[30] Foreign Application Priority Data

Apr. 26, 1982 [JP] Japan .................................. 57-68692

[51] Int. Cl.³ .......................................... F02M 51/00
[52] U.S. Cl. ...................................... 123/478; 123/494
[58] Field of Search ............... 123/436, 478, 480, 486, 123/494

[56] References Cited

U.S. PATENT DOCUMENTS

| 4,089,214 | 5/1978 | Egami et al. | 123/494 |
| 4,392,471 | 7/1983 | Miyagi et al. | 123/480 |
| 4,442,818 | 4/1984 | Kashiwaya et al. | 123/494 |
| 4,448,172 | 5/1984 | Kashiwaya et al. | 123/478 |
| 4,455,985 | 6/1984 | Asayama | 123/478 |

Primary Examiner—Parshotam S. Lall
Assistant Examiner—W. R. Wolfe
Attorney, Agent, or Firm—Antonelli, Terry & Wands

[57] ABSTRACT

A fuel injection control apparatus for controlling the amount and the timing of fuel injection with the aid of a microcomputer includes a hot-wire type flow sensor for detecting an instantaneous intake air flow velocity within an intake air passage of an internal combustion engine. The output signal of the hot-wire type flow sensor is sampled at every predetermined crank angle or at every predetermined time point to be stored in a RAM. The time at which the instantaneous velocity of the intake air flow within the intake passage becomes maximum is detected. The fuel injection timing of a fuel injection valve disposed in the intake passage is so controlled that the fuel injection is terminated around the time point at which the instantaneous intake air flow velocity is maximum.

6 Claims, 16 Drawing Figures ately universal as possible for various types and applications of the motor vehicles and additionally be susceptible to modifications, alternations and additions of the various control functions from the stand point of economy and operation performances.

FUEL INJECTION CONTROL APPARATUS FOR INTERNAL COMBUSTION ENGINE

The present invention relates generally to an apparatus for controlling an internal combustion engine and more particularly to a fuel injection controlling apparatus for an engine of a motor vehicle in which a microcomputer is made use of.

As a reference relevant to the subject matter of the present application, there may be cited a copending U.S. Application of T. SASAYAMA et al entitled "FUEL CONTROL APPARATUS FOR INTERNAL COMBUSTION ENGINE" filed claiming the Convention Priority based on Japanese Patent Application No. 32361/82 assigned to the same assignee.

In these years, a general or overall control for an internal combustion engine (also referred to simply as the engine) with the aid of a microcomputer is increasingly adopted with a view to enhancing various engine control functions.

The control functions vary diversely in dependence on the types of the motor vehicles as well as the fields in which they are destined to be operated. Accordingly, in the engine control system incorporating a microcomputer, a software for manipulating the engine control system is required to be as universal as possible for various types and applications of the motor vehicles and additionally be susceptible to modifications, alternations and additions of the various control functions from the stand point of economy and operation performances.

Heretofore, fuel injection timing of an engine is determined on the basis of the ON/OFF states of intake and exhaust valves of the engine. With such fuel injection control, difficulty is encountered in realizing the injection timing which is optimal over the whole operation range notwithstanding of variations in the load applied to the engine and the rotation speed thereof, involving degradations in generation of torque and properties of the exhaust gases. In other words, the fuel injection timing should desirably be changed as a function of the load imposed on the engine as well as the engine rotation speed. An apparatus for controlling the fuel injection timing is disclosed in U.S. Pat. No. 4,301,780 issued Nov. 24, 1982 and assigned to the same assignee.

In recent years, requirement imposed on purification of the exhaust gas of the motor vehicles becomes more and more severe. As an approach for satisfying the requirement, it is proposed to charge the fuel-air mixture in the engine cylinder in an axially stratified form to thereby realize satisfactory combustion of the mixture whose air-fuel ratio is of a relatively great value (i.e. lean mixture) as a whole. However, in the case of the internal combustion engine provided with a relatively long intake pipe or passage extending from the fuel injection valve to the intake valve of the cylinder, the injected fuel tends to be diffused and atomized in the course of being transported through the intake passage. Thus, difficulty is encountered in realizing the axially stratified charge in the above mentioned type of the internal combustion engine.

An object of the present invention is to provide a fuel injection control apparatus which is capable of improving the fuel consumption characteristic of an internal combustion engine and preventing torque characteristics and exhaust gas properties from being degraded.

The present invention starts from the fact that the air flow velocity in the intake passage attains the maximum value when the instantaneous air flow amount becomes maximum and proposes that the amount of intake air which undergoes changes in dependence on the engine load and/or engine speed is detected on the basis of the instantaneous air flow amount while the time point at which the fuel injection is to be terminated is determined on the basis of the maximum air flow velocity, for realizing the axially stratified charge and hence the optimal fuel control for the internal combustion engines, to thereby improve the fuel consumption characteristic while preventing the torque characteristic and the exhaust gas properties from being deteriorated.

The above and other objects and features of this invention will be more apparent from the following description when considered in connection with the accompanying drawings, in which.

Before entering into description of the preferred embodiment of the invention, the general principle thereof will first be elucidated.

Figure 1:
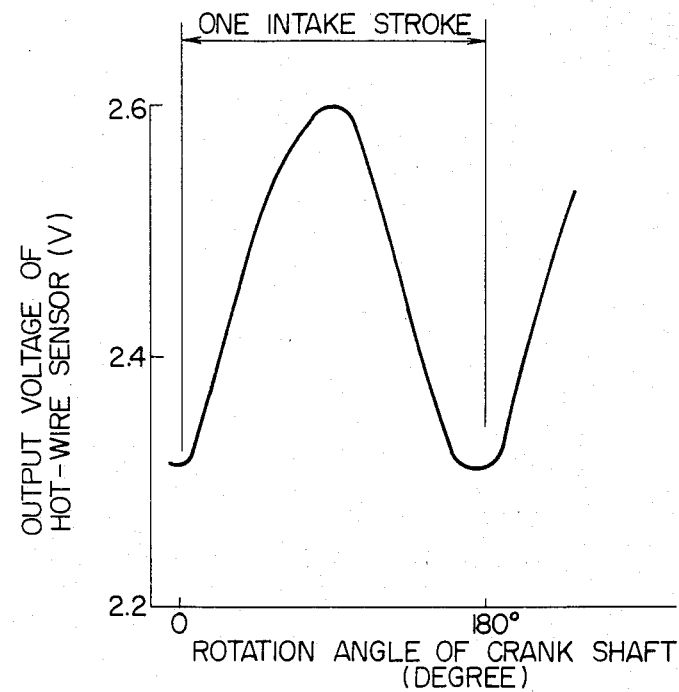
FIG. 1 is a view for graphically illustrating change in an output voltage of a hot-wire type flow sensor as a function of the rotation angle of a crank shaft of an engine.
Figure 2:
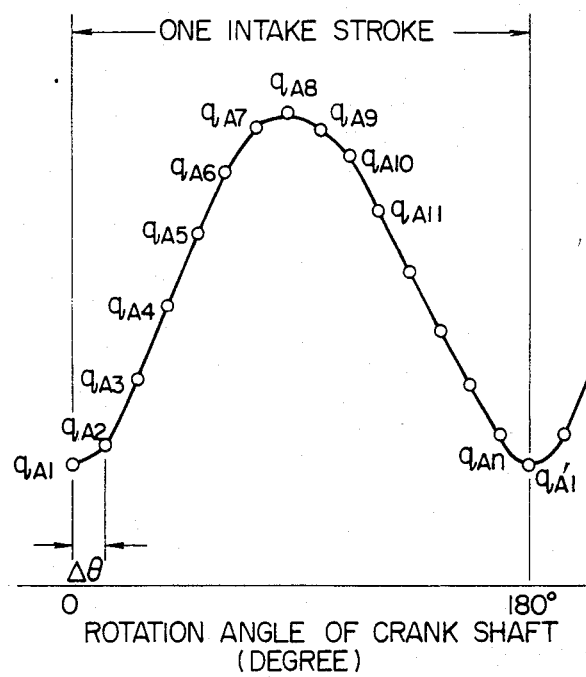
FIG. 2 is a view for graphically illustrating an example of data sampling in one intake stroke.

Fuel injected into an intake air passage of an engine by a fuel injection valve is supplied to cylinders of the engine, being carried by an intake air flow in the intake air pipe or passage. In this connection, it is noted that the velocity or amount of intake air flow is not constant but undergoes pulsation in the course of intake stroke, as is graphically illustrated in FIG. 1. Such pulsation can be detected with the aid of a hot-wire type air flow sensor. The output voltage V of the hot-wire sensor is related to a mass flow $q_A$ by the following expression:

$$V = \sqrt{C_1 + C_2 \sqrt{q_A}} \qquad (1)$$

where $C_1$ and $C_2$ are constants. The equation can be rewritten as follows:

$$V^2 = C_1 + C_2 \sqrt{q_A} \qquad (2)$$

Representing the output voltage V of the hot-wire sensor by $V_0$ when the rotation speed N of the engine is zero and the mass flow $q_A$ is zero, the expression (2) is simplified as follows:

$$V_0^2 = C_1 \qquad (3)$$

Accordingly, from the expressions (2) and (3), $$V^2 = V_0^2 + C_2 \sqrt{q_A} \qquad (4)$$

$$q_A = \frac{1}{C_2^2}(V^2 - V_0^2)^2 \qquad (5)$$

The instantaneous mass flow $q_A$ can thus be determined in accordance with the expression (5). Since instantaneous air flow velocity $v_A$ is in proportion to the mass flow $q_A$, it is also possible to determine the instantaneous intake air flow velocity $v_A$ on the basis of the output voltage V of the hot-wire sensor.

When fuel is injected into the intake air passage from the fuel injection valve at the time point at which the intake air flow is at a low speed, the fuel tends to be diffused and atomized in the course of being transported through the intake passage, as the result of which the fuel is charged to the cylinders without forming a mass of air-fuel mixture where fuel is locally enriched. As the consequence, there can be realized no axially stratified charge to the cylinder. Further, when the intake air flow is at a low speed, the injected fuel is likely to be deposited on the walls of the intake air passage.

On the other hand, when fuel is injected at the time point at or around which a maximum intake air flow velocity takes place, the fuel is not diffused to any appreciable degree during transportation through the intake passage, to be charged in the cylinders with the fuel-enriched mass being formed. Accordingly, even in the case of the engine which is provided with an intake passage of a relatively great length extending from the position of the injection valve to the cylinder, it is possible to form the locally enriched air-fuel mixture required for realizing the axially stratified charge to the cylinder by injecting the fuel at the time point around which the maximum intake air flow velocity prevails. For particulars of the stratified charge, reference is to be made to Ather A. Quader's article titled "The Axially-Stratified-Charge Engine" of "SAE Paper 820131".

Further, when the fuel injection through the injection valve is initiated before the intake air flow attains the maximum velocity while the fuel injection is terminated at the time point at which the instantaneous intake air velocity becomes maximum, a leading portion of the injected fuel forms a lean air-fuel mixture mass due to the diffusion ascribable to the relatively low intake air flow rate or velocity, while the trailing part of the injected fuel forms an enriched air-fuel mixture mass. When the air-fuel mixture thus stratified in the lean and enriched fuel portions is charged in the cylinder, the enriched portion of the air-fuel mixture prevails at an upper region of the cylinder, i.e. in the vicinity of the ignition plug. Thus, the axially stratified charge is realized.

In this connection, there may occur the case where the last part of the air-fuel mixture is cut off in dependence on the timing at which the intake valve of the cylinder is closed. In such case, there may be provided an additional circuit for supplementing the amount of the fuel as cut off.

An averaged air flow amount $Q_A$ during a single intake stroke of the cylinder is related to the instantaneous air flow amount $q_A$ for every rotation angle $\Delta Q$ of a crank shaft of the engine in accordance with the following expression:

$$Q_A = \frac{q_{Ai} \cdot \Delta Q + \ldots + q_{An} \cdot \Delta Q}{n \cdot \Delta Q} = \frac{\sum_{i=1}^{n} q_{Ai}}{n} \qquad (6)$$

The amount $Q_F$ of fuel injection per intake stroke is given by $$Q_F = \frac{K \cdot Q_A}{N} \qquad (7)$$

where N is the number of revolution of the engine per unit time (i.e. engine speed) and K represents a constant. Accordingly, the amount of fuel injection $Q_F$ for one intake stroke of the engine can be determined by determining the amount of the averaged air flow $Q_A$. The data of the instantaneous air flow $q_A$ can thus be utilized for determining the averaged air flow $Q_A$ for one intake stroke which is required for calculating the amount of fuel injection $Q_F$ per intake stroke.

Now, the invention will be described in detail in conjunction with an exemplary embodiment thereof.

Figure 3:
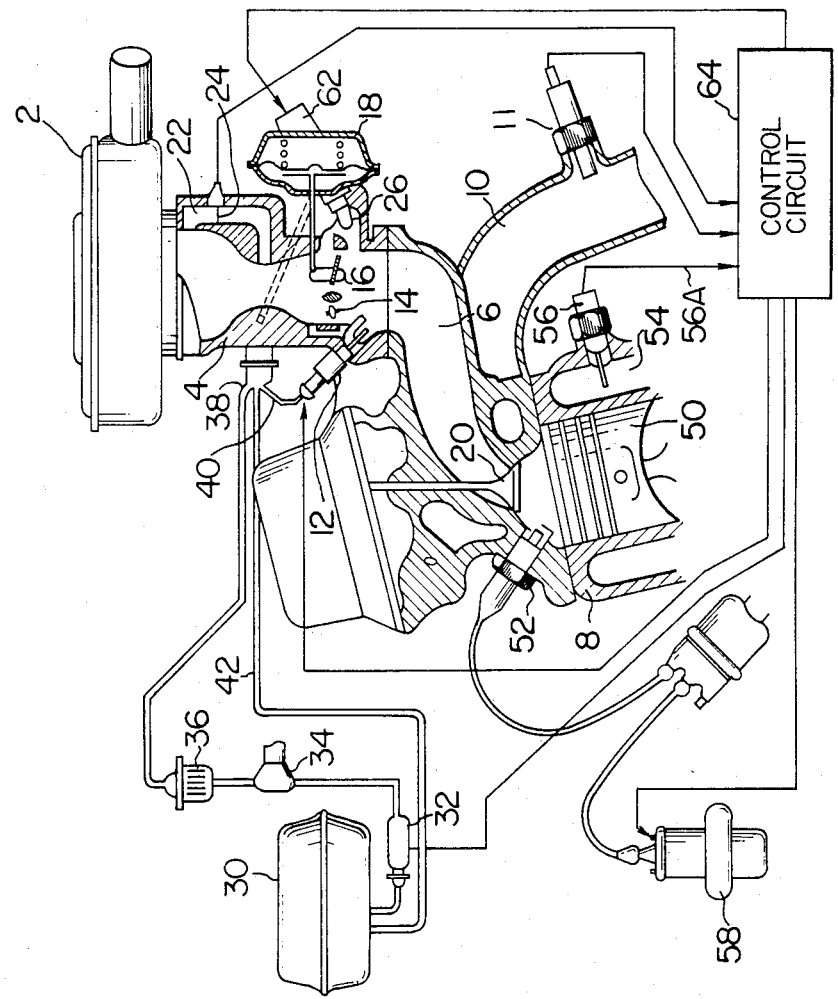
FIG. 3 is a view showing a control apparatus for a whole engine system.

Referring to FIG. 3 which shows a control apparatus for a whole internal combustion engine system, air taken in through an air cleaner 2 is supplied to cylinders 8 (only one of which is shown) through a throttle chamber 4 and an intake pipe 6. Gas resulted from combustion within the cylinder 8 is discharged to the atmosphere through an exhaust pipe 10. An $O_2$-sensor 11 (also referred to as λ-sensor) serves to detect the concentration of oxygen contained in the exhaust gases.

There is disposed within the throttle chamber 4 an injection valve or injector 12 for injecting fuel therein, the fuel injected being atomized within an air passage in the throttle chamber to be mixed with intake air to form an air-fuel mixture which is then supplied to the combustion chamber of the cylinder 8 upon opening of an intake valve 20.

Throttle valves 14 and 16 are disposed in the vicinity of the fuel injection valve or injector 12. The throttle valve 14 is mechanically coupled to an accelerator pedal so as to be operated by a driver. On the other hand, the throttle valve 16 is operatively coupled to a diaphragm device 18 in such a manner that the throttle valve 16 is in the fully closed state when air flow is small, while the throttle valve 16 begins to be opened as a negative pressure applied to the diaphragm device 18 is increased in response to increasing in the air flow amount to thereby prevent the resistance to air intake from being increased.

An air passage 22 is provided at a location upstream of the throttle valves 14 and 16 in the throttle chamber 4. An electric heat generating element 24 which constitutes the hot-wire type air flow sensor is disposed in the air passage 22, which sensor produces an electric voltage signal varying in dependence on the air flow rate or velocity which is determined from a relationship between the air flow velocity and the heat transfer of the hot-wire or electric heat generating element. Since the heat generating element 24 is positioned within the air passage 22, it can be protected from the exposure to a gas of high temperature produced upon back-firing of the cylinder 8 as well as contamination by dusts or the like particles carried by the intake air. The outlet of the air passage 22 opens in the vicinity of the narrowest portion of a Venturi, while the inlet of the air passage 22 opens at a location upstream of the Venturi.

The throttle valve 14 is provided with a throttle angle sensor for detecting the aperture thereof, although the sensor is not shown in FIG. 3. The detection signal output from the throttle angle sensor is supplied to a multiplexer 120 of a first analogue-to-digital or A/D converter ADC 1, as will hereinafter be described in conjunction with FIG. 6.

The fuel supplied to the injector 12 is beforehand supplied to a fuel pressure regulator 38 from a fuel tank or container 30 through a fuel pump 32, a fuel damper 34 and a filter 36. Thus, the fuel is supplied under regulated pressure to the fuel injector 12 from the fuel pressure regulator 38 through a pipe 40, wherein a part of fuel is fed back to the fuel tank 30 from the fuel pressure regulator 38 by way of a return pipe 42 so that difference between the pressure prevailing in the intake conduit 6 into which the fuel is injected from the injector 12 and the pressure of the fuel supplied to the injector 12 constantly remains constant.

The air-fuel mixture sucked into the cylinder 8 through the intake valve 20 is compressed by a piston 50 and undergoes combustion triggered by a spark produced by an ignition plug 52. Combustion energy thus produced is converted into kinematic or mechanical energy. The cylinder 8 is cooled by cooling water 54 of which temperature is measured by means of a coolant temperature sensor 56. The temperature value thus measured is utilized as data representing the temperature of the engine. The ignition plug 52 is supplied with a high voltage in conformity with an ignition timing from an ignition coil 58.

Disposed in association with a crank shaft (not shown) is a crank angle sensor 146 (refer to FIG. 6) which produces a reference angle signal at every reference crank angle (e.g. 180°) and a position signal at every predetermined angle (e.g. 0.5) of the crank shaft in dependence on rotation of the engine.

The output signals from the crank angle sensor 146, the output signal 56A of the coolant or water temperature sensor 56 and the electric signal output from the heat generating element (hot-wire) 24 are supplied to a control circuit 64 constituted by a microcomputer or the like to be arithmetically processed, whereby operations of the injector 12 and the ignition coil 58 are controlled by the output signals of the control circuit 64, as will hereinafter be described in more detail in conjunction with FIG. 6.

In the internal combustion engine provided with the controlling system of the arrangement mentioned above, there is disposed within the throttle chamber 4 a bypass passage 26 which is communicated to the intake conduit 6 across the throttle valve 16 and has a bypass valve 62 controlled to be opened or closed. A driving unit for this bypass valve 62 is coupled to the output of the aforementioned control circuit 64 to open or close the bypass valve 62 under the control of the control circuit 64.

More particularly, the bypass valve 62 is located in the bypass passage 26 disposed across the throttle valve 16 and controlled to be opened or closed by a pulse current. The bypass valve 62 is so arranged as to change the cross-sectional area of the bypass passage 26 in dependence on magnitude of the lift of the bypass valve 62 realized through an associated driving system which is controlled by the associated output signal of the control circuit 64. In other words, the control circuit 64 produces a periodic on/off signal which is applied to the bypass valve 62 to thereby regulate the lift of the bypass valve 62.

Figure 4:
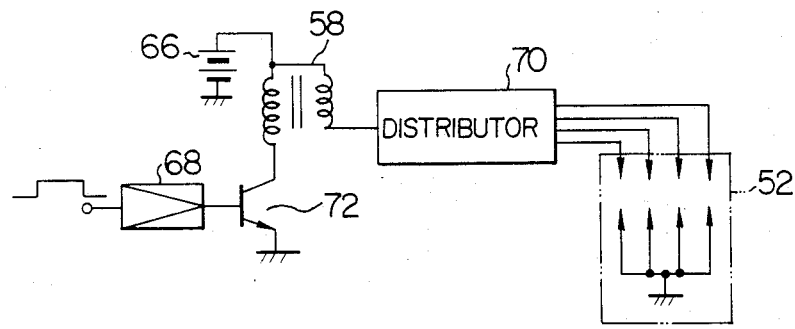
FIG. 4 is a schematic circuit diagram showing an arrangement of an ignition device employed in the apparatus shown in FIG. 3.

Referring to FIG. 4 which shows a circuit arrangement of the ignition system briefed above in conjunction with FIG. 3, a pulse current is applied to the base of a power transistor 72 through an amplifier 68, whereupon the transistor 72 is turned on (i.e. becomes conductive). As a result, a current is caused to flow through a primary winding of the ignition coil 58 from a battery 66. In response to the failing edge of the pulse current, the transistor 72 is turned off (i.e. becomes nonconductive or blocked), inducing a high voltage in the secondary winding of the ignition coil 58. This high voltage is distributed through a distributor 70 to the ignition plugs provided in the respective cylinders of the engine in synchronism with the rotation thereof.

Figure 5:
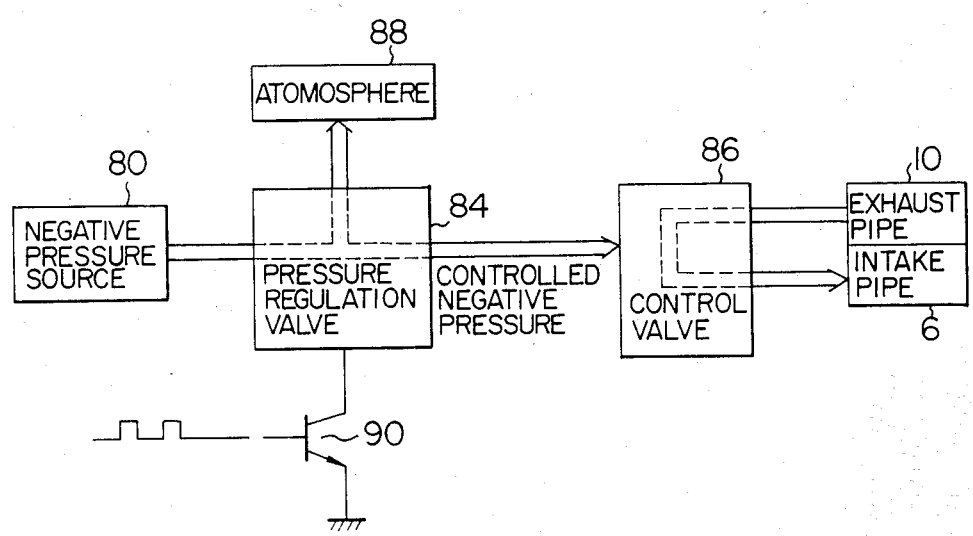
FIG. 5 is a view for illustrating an arrangement of an exhaust gas recirculation system.

FIG. 5 is a view illustrating an exhaust gas recirculation system (hereinafter referred to simply as EGR system). Referring to this figure, a predetermined negative pressure or vacuum is applied to a control valve 86 from a negative pressure (vacuum) source 80 through a pressure regulation valve 84. The pressure regulation valve 84 serves to control the ratio at which the predetermined negative pressure of the vacuum source 80 is bled to the atmosphere in dependence on the duty cycle of a repetition pulse signal applied to the base of a switching transistor 90, to thereby control the level of the negative pressure applied to the control valve 86. The amount of the exhaust gas recirculated from the exhaust pipe 10 to the intake conduit 6 is controlled in dependence on the negative pressure which in turn is controlled by the pressure control valve 84.

Figure 6:
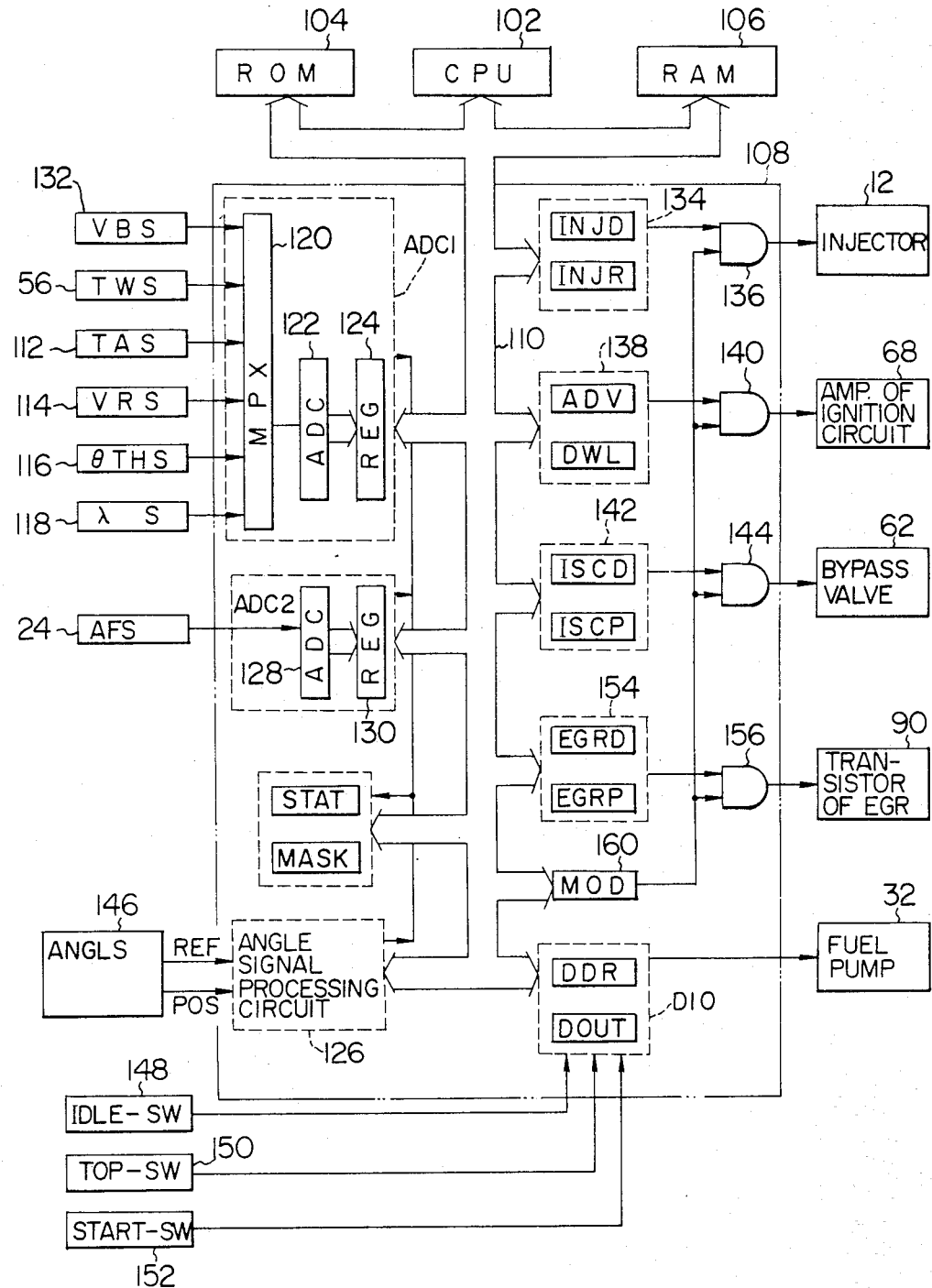
FIG. 6 is a schematic block diagram showing a general arrangement of an engine control system.

FIG. 6 shows a general arrangement of the control circuit 64 which includes as main components a central processing unit or CPU 102, a read-only memory 104 (hereinafter termed ROM in abridgement), a random access memory 106 (hereinafter termed simply as RAM), and input/output circuit 108. The CPU 102 operated to perform arithmetic operations on input data supplied from the input/output circuit 108 in accordance with various programs stored in ROM 104, the results of the arithmetic operations being returned to the input/output circuit 108. The RAM 106 is made use of for temporarily storing data required for the arithmetic operations. Transferring of various data among the CPU 102, the ROM 104, the RAM 106 and the input/output circuit 108 are performed by way of a control bus line 110 which is constituted by a data bus, a control bus and an address bus.

The input/output circuit 108 includes input/output means which comprises a first analogue-to-digital or A/D converter (hereinafter referred to as ADC 1), a second analogue-to-digital converter (hereinafter referred to as ADC 2), an angle signal processing circuit 126 and a discrete input/output circuit (hereinafter referred to DIO) for receiving and outputting single-bit information.

The output signals of a battery voltage detecting sensor 132 (hereinafter referred to also as VBS), the cooling water temperature sensor 56 (hereinafter referred to also as TWS), an atmospheric pressure sensor 112 (hereinafter referred to also as TSA), a regulated voltage generator 114 (hereinafter referred to also as VRS), the throttle angle sensor 116 (hereinafter referred to also as θTHS) and the oxygen concentration sensor or λ-sensor 118 (hereinafter referred to also as λS) are supplied to the respective inputs of a multiplexer (hereinafter referred to also as MPX) 120 which selects one of these input signals and applies the selected one to an analogue-to-digital converter circuit 122 (also referred to as ADC). The digital value appearing at the output of the ADC 122 is held by a register 124 (hereinafter referred to also as REG).

The output signal of the hot-wire type flow sensor 24 (hereinafter referred to as AFS) is inputted to the ADC 2 to undergo analogue-to-digital conversion through an analogue-to-digital converter circuit 128 (hereinafter referred to as ADC), the resulting digital value being placed in a register (hereinafter referred to as REG) 130.

As described hereinbefore, the crank angle sensor 146 (hereinafter referred to as ANGLS) produces the reference crank angle signal (hereinafter referred to as REF) which represents the crank angle of 180° in the case of a four-cylinder engine, by way of example, and the position signal (hereinafter referred to as POS) which represents a minute incremental crank angle of 0.5°, by way of example, both of these signals REF and POS being supplied to the angle signal processing circuit 126 to be shaped with respect to the waveform.

The DIO has the inputs supplied with a signal produced by an idle switch 148 (hereinafter referred to also as IDLE-SW) and indicating that the engine is in the idling state, a signal produced by a top gear switch 150 (hereinafter referred to as TOP-SW) and indicating that the transmission coupled to the output of the engine is at a top speed position, and a signal produced by a starter switch 152 (hereinafter referred to also as START-SW).

Next, description will be made on pulse output circuits for producing pulse signals on the basis of the results of the arithmetic operations executed by the CPU 102 and the objects to be controlled by the pulse signals. An injector control circuit 134 (hereinafter referred to as INJC) is a circuit for converting the digital values resulted from the arithmetic operations into pulse output signals. More specifically, the INJC 134 prepares, on the basis of the data contained in a register (INJD) and representing the amount of fuel injection and the data contained in an angle register (INJR) and representing the crank angle at which the fuel injection is initiated, a pulse signal whose pulse width corresponds to the amount of fuel injection, which pulse signal is supplied to the injector 12 by way of an AND gate 136. A typical example of the angle register INJR is disclosed in U.S. Pat. No. 4,276,601 issued July 30, 1981 and assigned to the assignee of the present application. In this connection, the registers INJD and INJR employed in the embodiment being illustrated correspond to registers 412 and 406, respectively, which are disclosed in FIG. 7 of the U.S. patent cited above. Further, the registers ADV, DWL, ISCD, ISCP, MOD, DIO in FIG. 6 correspond to the registers 414, 416, 424 and 422 in FIG. 7, MODE in FIG. 4 and 130 in FIG. 3 of the U.S. patent cited above, respectively. Further, the angle signal processing circuit 126 of the illustrated embodiment corresponds to the combination of the circuits 460, 462 and 426 also shown in FIG. 7 of the above cited U.S. patent.

The ignition pulse generating circuit 138 (hereinafter referred to also as IGNC) includes a register (referred to as ADV) in which data of the ignition timing is placed and a register (referred to as DWL) in which data representative of the timing at which the primary current is initiated to flow through the ignition coil. These data placed in the registers ADV and DWL are loaded from the CPU 102. The ignition pulse generating circuit 138 produces a pulse signal on the basis of the data placed in the registers ADV and DWL, which pulse signal is applied to the amplifier 68 shown in FIG. 4 through an AND gate 140.

The duty ratio of the bypass valve 62 (i.e. the ratio at which the valve 62 is opened) is controlled by a pulse signal supplied from a control circuit 142 (hereinafter referred to as ISCC) through an AND gate 144. To this end, the ISCC 142 includes a register ISCD at which the pulse width is set and a register ISCP at which the pulse repetition frequency is set.

An EGR control pulse generating circuit 154 (hereinafter referred to as EGRC) for controlling the transistor 90 which in turn controls the EGR control valve 86 includes a register EGRD at which the duty ratio of the pulse controlling the transistor 90 is set and a register EGRP at which a value indicative of the repetition frequency of the transistor control pulse is set. The pulse signal output from the EGRC 154 is applied to the transistor 90 by way of an AND gate 156.

The input and output signals each of a single bit are controlled by the circuit DIO. The single-bit input signals includes the IDLE-SW signal, the TOP-SW signal and the START-SW signal mentioned hereinbefore. The single-bit output signal includes a pulse signal for driving the fuel pump. The circuit DIO includes a register DDR for determining whether the terminals of DIO are to be used as the output terminals or the input terminals and a register DOUT for latching the output data.

A register 160 (hereinafter referred to also as MOD) serves to hold instructions for commanding various states or modes in the input/output circuit 108. For example, there can be placed in this register 160 a command for enabling or disabling all the AND gates 136, 140, 144 and 156. In other words, by placing corresponding commands or instructions in this register or MOD 160, activation and stoppage of operations of INJC, IGNC and/or ISCC can be controlled.

Figure 7:
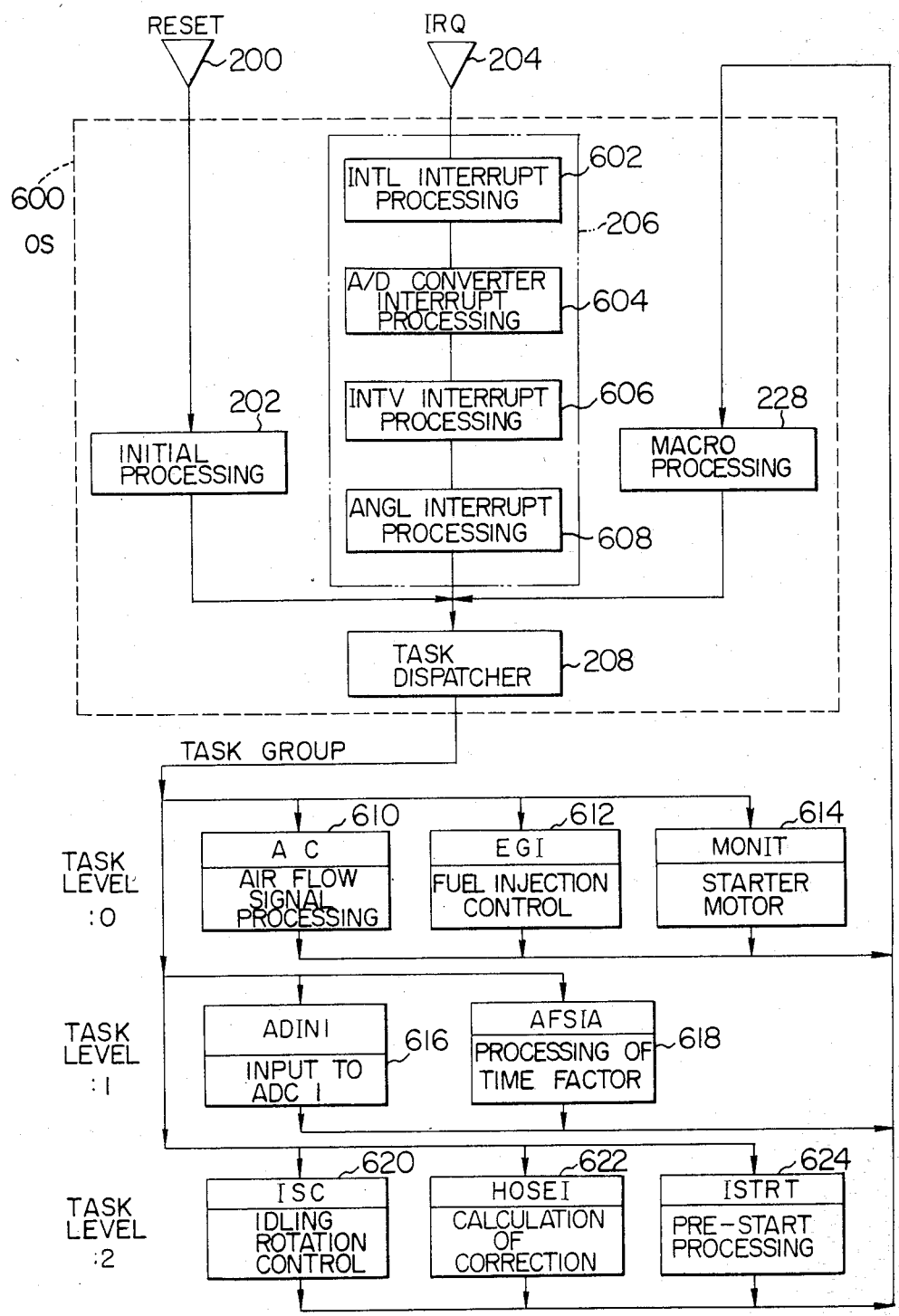
FIG. 7 shows a flow chart for illustrating engine control according to the present invention.

FIG. 7 shows a specific example of a program system for the control circuit shown in FIG. 6. Referring to the figure, an operating system program OS 600 includes an initialization processing program 202, interrupt processing programs 206, a task dispatcher 208 and a macro processing program 228.

The interrupt processing program 206 contains various types of processing mentioned below. First, an initial interrupt processing 602 (hereinafter referred to as INTL interrupt processing) operates to produce an initial interrupt a number of times which corresponds to a half of the number of the engine cylinders (i.e. twice in the case of the four-cylinder engine) during one rotation of the engine in response to an initial interrupt request signal generated in synchronism with the rotation of the engine. By this initial interrupt, the amount of fuel injection $Q_F$ calculated in accordance with the expression (7) through the EGI task 612 is set at the EGI register of the input/output interface circuit 108. Further, this initial interrupt provides a reference point for sampling the output voltage V of the hot-wire type flow sensor. Second, an A/D converter interrupt processing 604 includes two types of subprocessings, one of which is for the interrupt of the A/D converter 1 (hereinafter referred to as ADC 1 interrupt), while the other is for the interrupt of the A/D converter ADC 2 (hereinafter referred to as ADC 2 interrupt). The A/D converter ADC 1 has a precision corresponding to 8 bits and is supplied as inputs thereto the source voltage signal, the cooling water temperature signal, the intake air temperature signal and other signals for regulations. The A/D converter ADC 1 serves to designate the input points or ports for the multiplexer 120 and simultaneously initiates the A/D conversion, after which the ADC 1 interrupt is generated. This interrupt is made use of only before the cranking operation. Further, the A/D converter 128 is used only for fetching the air flow signal. After the conversion, the ADC 2 interrupt is issued. This interrupt also is used only before the cranking.

Third, an interval interrupt processing program 606 (hereinafter referred to as INTV interrupt processing program) is executed for producing the interval or INTV interrupt signal at every time set at an INTV register (e.g. 10 ms), which signal is utilized as a basic signal for supervising the times of the tasks each to be activated periodically at a predetermined interval. This INTV signal serves to update a software timer to thereby activate the task at the time point predetermined for that task. Finally, an angle interrupt processing program 608 (hereinafter referred to as ANGL interrupt processing program) issues an interrupt at every predetermined crank angle for sampling the output signal of the flow sensor 24 and additionally serves to detect the crank angle at the time when the instantaneous air flow is at maximum.

In the following table 1, there are summarized the various interrupts and the corresponding processings.

TABLE 1

| Interrupts | Processings |
| --- | --- |
| INTL | Fuel injection time is set at EGI register |
| ADC 1 | Task ADIN 1 is activated |
| ADC 2 | Task AC for processing air flow signal is activated |
| INTV | Time points at which tasks ADIN 2, EGI, MONIT, ADIN 1, AFSIA and ISC are activated periodically are checked to thereby activate the tasks at the respective predetermined time points. |
| ANGL | Output signal of the flow sensor is sampled |

The initial processing program 202 is a program for preprocessing to actuate a microcomputer, for example, and serves to execute clearing the contents of the RAM 106, setting up the initial values of the registers in the input/output interface circuit 108, and storing input information for the preprocessing necessary to control the engine, for example, data such as cooling water temperature $T_W$, battery voltage. The macro processing program 228 is a program for sending information of the completion to the task dispatcher 208 after the execution of each task is completed. The tasks which are activated by the interrupt described above are as follows. The tasks belonging to the task level 0 includes the air flow signal processing task (hereinafter referred to as AC task), a fuel injection control task (hereinafter referred to as EGI task) and a start monitor task (referred to as the MONIT task). The tasks belonging to the task level 1 includes an ADI input task (hereinafter referred to as ADIN1 task) and a time factor processing task (hereinafter referred to as AFSIA task). Finally, the tasks belonging to the task level 2 includes an idling rotation control task (hereinafter referred to as ISC task), a correction calculating task (hereinafter referred to as HOSEI task) and a pre-start processing task (hereinafter referred to as the ISTRT task).

In the following table 2, there are summarized allotment of levels to the various tasks mentioned above and the functions of the tasks.

TABLE 2

| | | | ALLOTMENT OF TASK LEVELS AND FUNCTIONS OF TASKS | |
| --- | --- | --- | --- | --- |
| Level | Identification of programs | Task Nos. | Functions | Interval of periodical activation |
| | OS | | Interrupt for controlling engine rotation. Other OS processings. | |
| 0 | AC | 0 | Accumulation and averaging of $Q_A$, control of acceleration and cut-off of fuel injection. | 10 ms |
| | EGI | 1 | Calculation of amount of fuel injection, regulation of CO and calculation of advance angle for ignition. | 20 ms |
| | MONIT | 3 | Control of starter switch (OFF), control of fuel injection time upon engine starting, and starting and stoppage of software timer. | 40 ms |
| 1 | ADIN 1 | 4 | Inputting to A/D converter 1, calibration and filtering. | 50 ms |
| | AFSIA | 6 | Control of time factors for after-start, after-idling and after-acceleration. | 120 ms |
| 2 | ISC | 8 | Control of idling rotation speed. | 200 ms |
| | HOSEI | 9 | Calculation of correction factor. | 300 ms |
| | ISTRT | 11 | Calculation of initial value of EGI, control of starter switch (ON), starting and stoppage of software timer, and activation of fuel pump | 30 ms |

TABLE 2-continued

| | | ALLOTMENT OF TASK LEVELS AND FUNCTIONS OF TASKS | |
|---|---|---|---|
| Level | Identification of programs | Task Nos. Functions | Interval of periodical activation |
| | | and I/OLSI. | |

As will be seen from the table 2, the periodical time intervals at which the various tasks are activated in response to the respective interrupts are previously determined. Data summarized in the Table 2 are stored in the ROM 104.

Figure 8A:
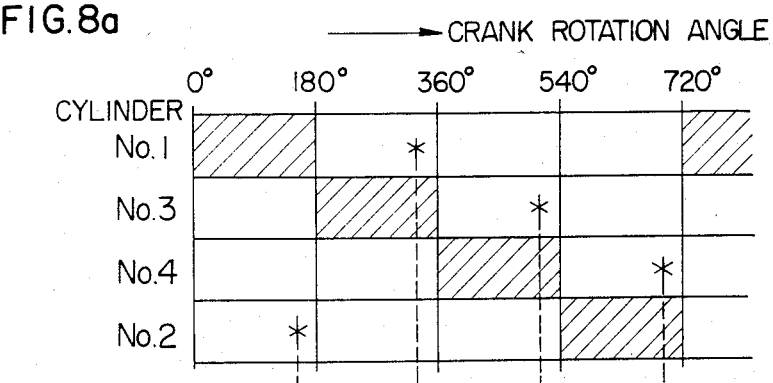
FIGS. 8a and 8b are views for illustrating fuel injection timing and ignition timing in an engine to which the invention is applied.
Figure 8B:
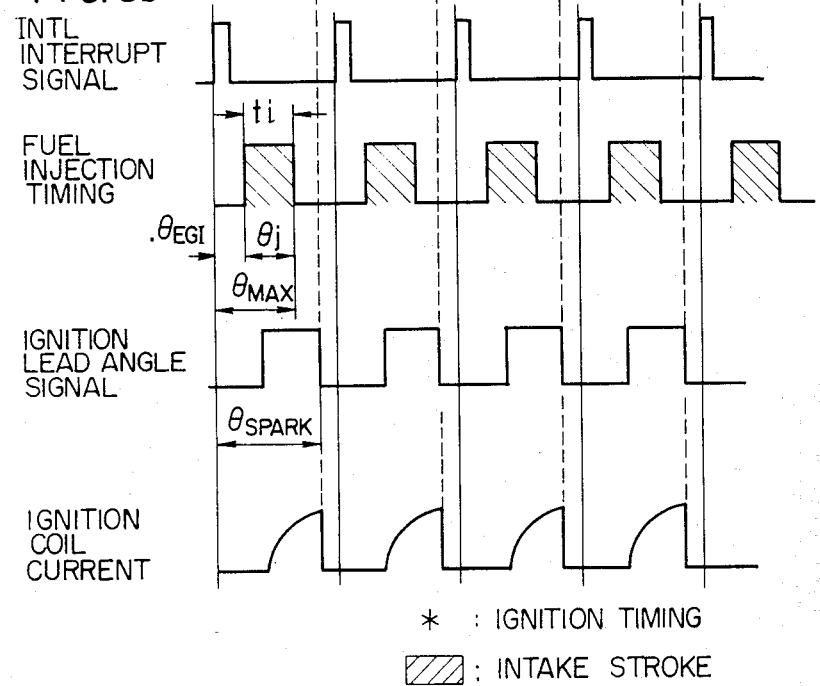

Next, the INTL interrupt processing and the ANGL interrupt processing will be described in conjunction with the processing of the output signal originating in the hot-wire flow sensor. FIGS. 8a and 8b illustrate relations among the crank rotation angle, the intake stroke, the ignition timing, the fuel injection timing and the INTL interrupt signal in the assumed case of a four-cylinder engine. The INTL interrupt signal is generated at the crank rotation angles of 0°, 180°, 360°, 540°, 720°, . . . , respectively. On the other hand, as to the fuel injection timing, the fuel injection is initiated with a delay of $\theta_{EGI}$ relative to the INTL interrupt signal, wherein the fuel is injected by the injector for a time duration $t_i$. With the present invention, it is intended to set the delay angle $\theta_{EGI}$ at an optimal value in dependence on the load of the engine. For the ignition, the timing is so set that the electrical energization of the ignition coil is initiated in response to the rise-up of the ignition advance angle signal, and that the ignition takes place in response to the falling edge of the ignition advance angle signal. Such ignition timing can be set at an angle $\theta_{SPARK}$ relative to the INTL interrupt signal.

Figure 9:
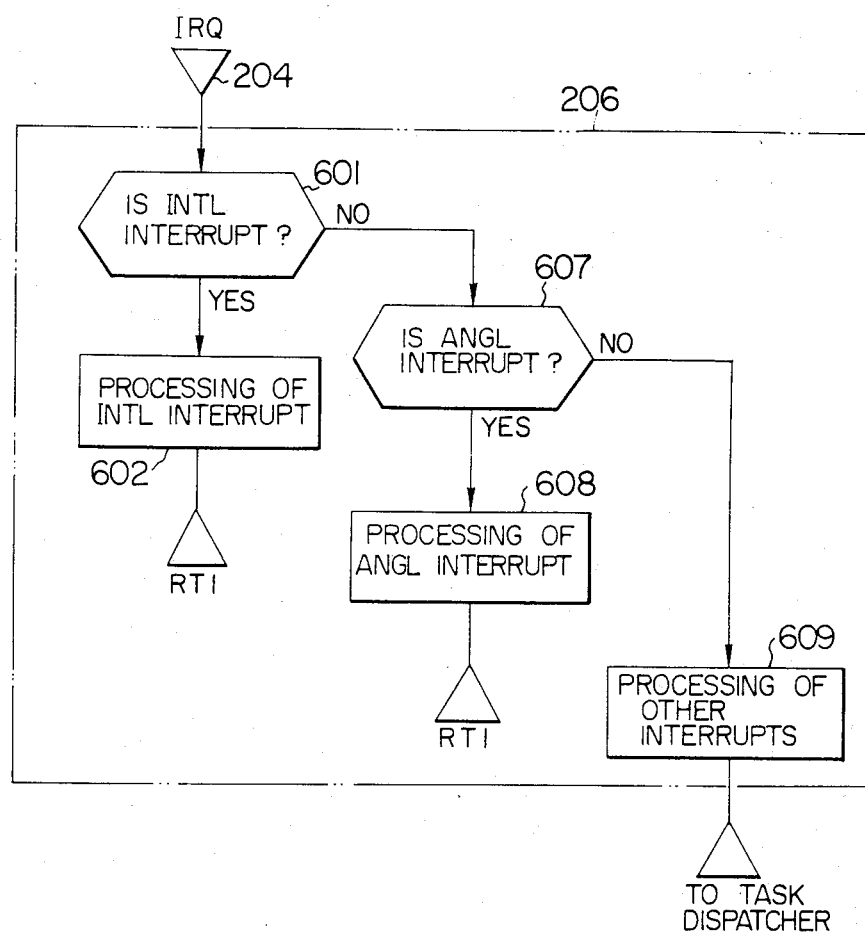
FIG. 9 is a flow chart for illustrating polling state in interrupt processing.
Figure 10:
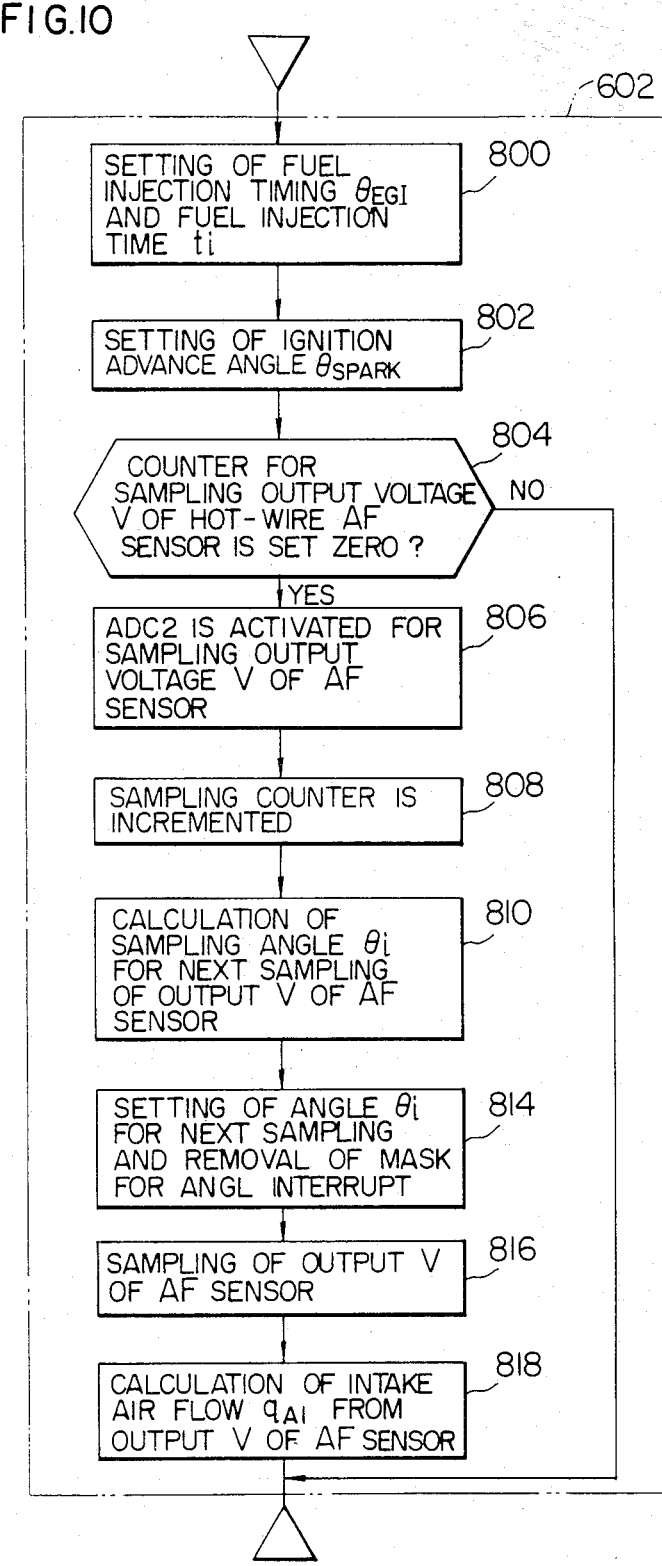
FIG. 10 is a flow chart for illustrating an INTL interrupt processing.
Figure 11:
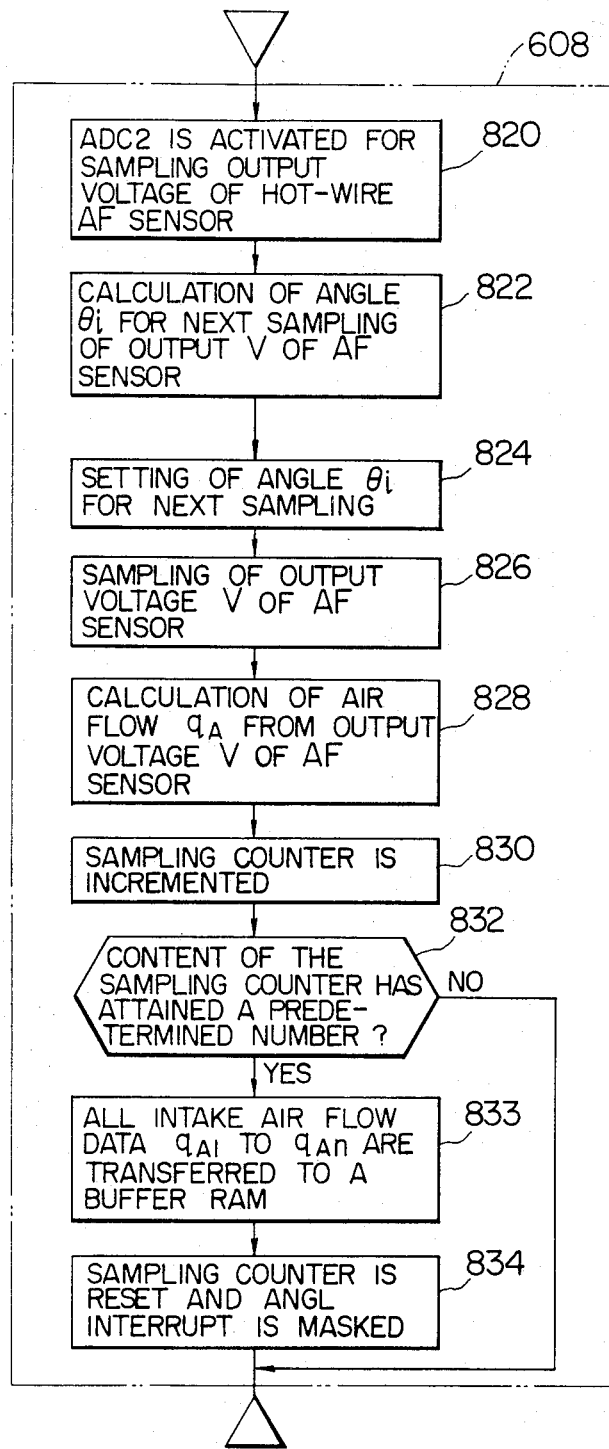
FIG. 11 is a flow chart for illustrating an ANGL interrupt processing.

FIGS. 9 to 11 show flow charts for illustrating sampling and processing of the output voltage of the hot-wire flow sensor. FIG. 9 illustrates the polling of an interrupt request or IRQ 204. At a step 601, it is determined whether or not the IRQ is for the INTL interrupt. In the case of the INTL interrupt, the INTL interrupt processing is executed at a step 602, which ends with a return from interrupt command (hereinafter termed RTI).

When the IRQ 204 is found not to be for the INTL interrupt at the step 601, it is decided at a step 607 whether or not the IRQ 204 is for the ANGL interrupt. If the decision has proven affirmative (YES), the ANGL interrupt processing is executed and ends with the RTI. In case the IRQ 204 is found not to be for the ANGL interrupt at the step 607, other interrupt processing is executed at a step 609 and then the program proceeds to the task dispatcher.

FIG. 10 shows a flow chart for illustrating details of the step 602 shown in FIG. 9. At a step 800, data of the fuel injection timing $\theta_{EGI}$ and the fuel injection time $t_i$ stored in the RAM at particular addresses are loaded in the I/O registers INJR and INJD shown in FIG. 6. At a next step 802, the value of the advance angle for ignition $\theta_{SPARK}$ arithmetically determined through the task EGI is placed in the register ADV. At a step 804, decision is made as to whether the sampling of the output voltage V of the hot-wire flow sensor is to be initiated or not in dependence on whether the content of a counter for sampling the output voltage V of the hot-wire air flow (AF) sensor is zero (0) or not. If the content of this counter is 0 (zero), this means that the sampling of the output voltage V of the hot-wire flow sensor is for the crank angle of 0° shown in FIG. 8a, whereby the ADC 2 is activated at a step 806 for sampling the output voltage V of the hot-wire flow sensor. At a step 808, the sampling counter is incremented for counting up the number of the samplings as effected. At a step 810, the sampling angle $\theta_i$ is arithmetically determined for sampling and fetching the output voltage V of the hot-wire flow sensor at the succeeding step 608 (FIG. 9). At a step 814, the sampling angle $\theta_i$ thus determined is set and at the same time mask for the ANGL interrupt is cleared. At a step 816, the output voltage V of the hot-wire air flow (AF) sensor is sampled and fetched. The execution of the steps 806 to 816 requires 50 $\mu s$ or more for the A/D conversion. At a step 818, the instantaneous intake air flow $q_{A1}$ is arithmetically determined on the basis of the output voltage V sampled at the step 816. In case of the INTL interrupt, the sampling or fetching of the intake air flow rate is executed only once; the other intake air flow rates $q_{A2}$ to $q_{An}$ are subsequently sampled at every sampling angle $\theta_i$ through the ANGL interrupt processing at the step 608.

FIG. 11 illustrates details of the ANGL interrupt processing which is intended for arithmetically determining the instantaneous air flows $q_{A2}$ to $q_{An}$. More specifically, the ADC 2 is activated for sampling the output voltage V of the hot-wire air flow (AF) sensor at a step 820. At the next step 822, the sampling angle $\theta_1$ at which the output voltage V of the hot-wire flow sensor is to be next sampled is arithmetically determined.

At a step 824, the sampling angle $\theta_i$ thus determined is set. At a step 826, the output voltage V of the hot-wire air flow (AF) sensor is sampled and fetched. Execution of the steps 820 to 826 takes a time of 50 $\mu s$ or more as is in the case of execution of the steps 806 to 816 described above in conjunction with FIG. 10. At a step 828, the intake air flow $q_A$ is arithmetically determined on the basis of the output voltage V of the hot-wire flow sensor. At a step 830, the sampling counter is incremented. At a step 832, it is decided if the sampling of the output voltage V of the hot-wire flow sensor has been effected a predetermined number of times. If the decision has proven affirmative (YES), all the data of the instantaneous intake air flows $q_{A1}$ to $q_{An}$ stored in the RAM are transferred to another RAM (buffer memory) at a step 833. By virtue of such arrangement, it is possible to detect the maximum instantaneous intake air flow velocity from the data of the instantaneous intake air flows $q_{A1}$ to $q_{An}$ stored in the buffer RAM, even when the data placed in the first mentioned RAM are rewritten or updated from time to time. At a step 834, the sampling counter is cleared and at the same time the ANGL interrupt is masked. In this way, the output voltage of the hot-wire sensor is sampled at every angle $\theta_i$ in the course of one intake stroke.

Figure 12:
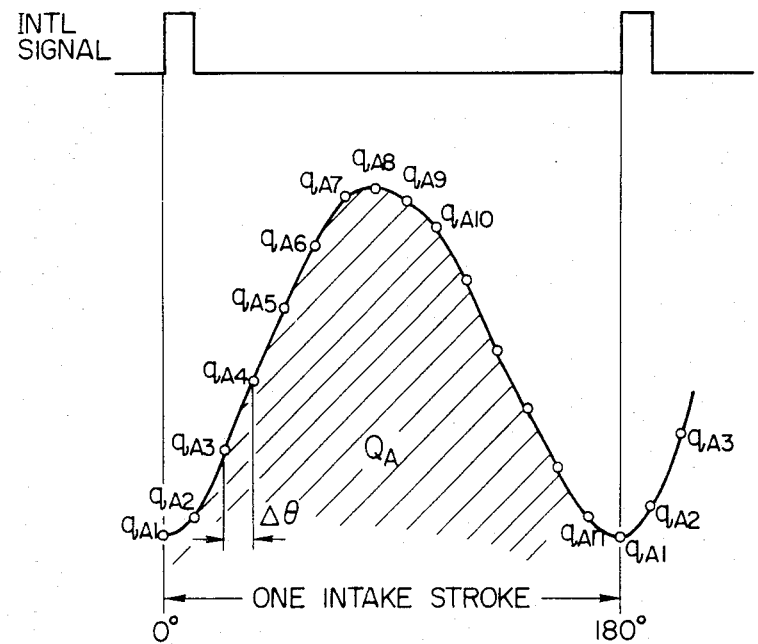
FIG. 12 is a view for illustrating sampling of an output signal of the hot-wire type flow sensor at every predetermined angle according to an embodiment of the invention.
Figure 13:
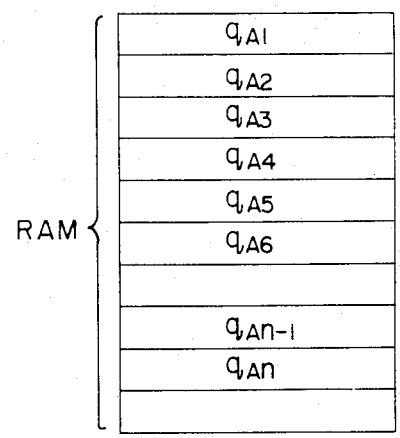
FIG. 13 shows a table provided in a RAM for storing the sampled values of the output signal of the flow sensor.

FIG. 12 is a view for graphically illustrating relation between the INTL signal and the samplings of the instantaneous intake air flows during one intake stroke. FIG. 13 illustrates the state in which the instantaneous intake air flows are stored in the RAM.

Figure 14:
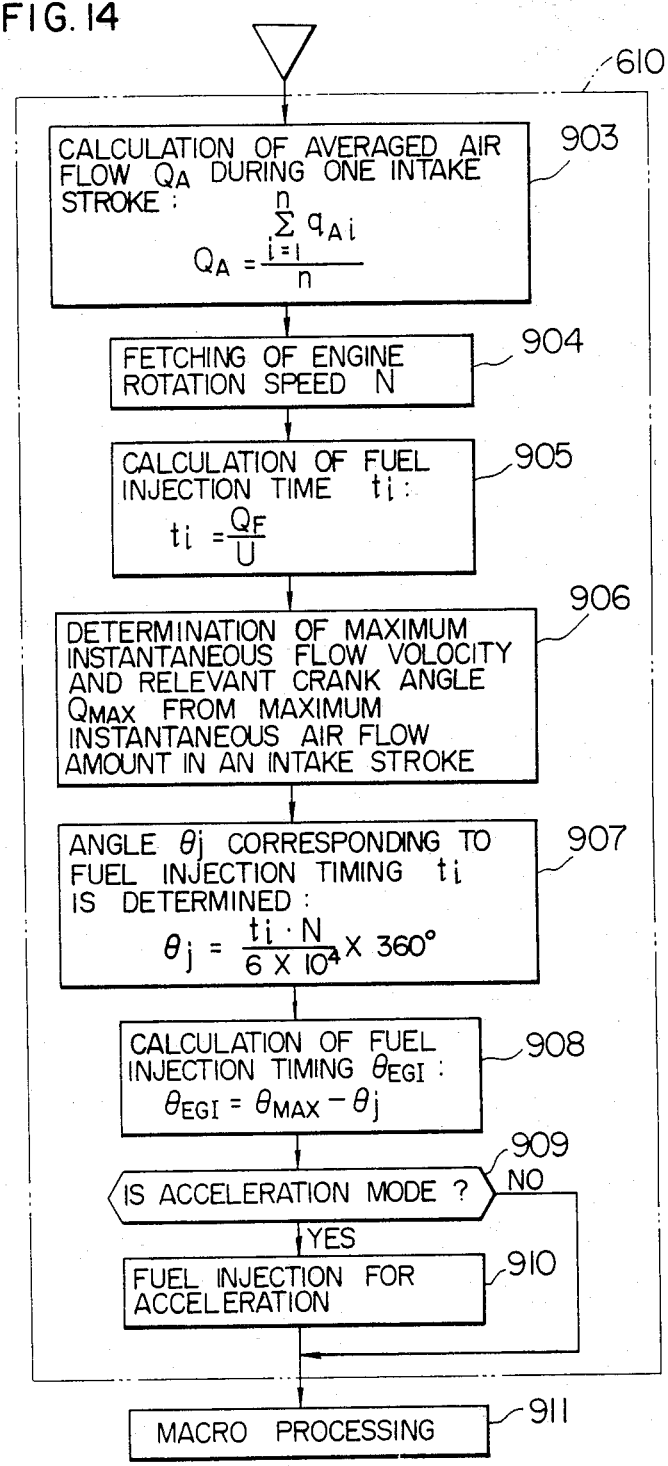
FIG. 14 shows a flow chart for illustrating details of an air flow signal processing task.

Next, referring to FIG. 14, description will be made of the AC task 610 for processing the intake air flow signal (refer to FIG. 7). In the air flow signal processing, an averaged air flow $Q_A$ is arithmetically determined at a step 903 from the data of the instantaneous intake air flows $q_{A1}$ to $q_{An}$ transferred to the buffer RAM in accordance with the following expression:

$$Q_A = \left( \sum_{i=1}^{n} q_{Ai} \right) / n$$

Next, at a step 904, the engine rotation speed N is determined by counting the crank angle signals POS supplied from the angle sensor ANGS (shown in FIG. 6) within a predetermined time. At a step 905, the fuel injection time $t_i$ is calculated in accordance with the expression: $t_i = Q_F/U$ where U represents the amount of fuel injected per unit time and Q represents the amount of the fuel injection arithmetically determined in accordance with the expression (7) through the task 612 shown in FIG. 7. Data or value of the thus determined injection time $t_i$ is stored in the RAM at a particular address. At a subsequent step 906, the maximum instantaneous intake air flow amount during the one intake stroke is detected from the data of $q_{A1}$ to $q_{An}$ transferred to the buffer RAM. Since the intake air flow velocity is proportional to the amount of the intake air (i.e. intake air flow), it is possible to determine the crank angle $Q_{MAX}$ at the time point at which the instantaneous intake air flow velocity is maximum. Next, at a step 907, the angle $\theta_j$ corresponding to the fuel injection time $t_i$ calculated at the step 905 is arithmetically determined in accordance with $$\theta_j = \frac{t_i \cdot N}{6 \times 10^4} \times 360°,$$

provided that $t_i$ is given in terms of millisecond and that N is given in terms of rpm. Next, at a step 908, the injection initiating timing $\theta_{EGI}$ is calculated in accordance with $\theta_{EGI} = Q_{MAX} - \theta_j$. At a step 909, decision is made as to whether the engine is in the state of acceleration on the basis of the signal output from the throttle angle sensor $\theta$THS shown in FIG. 6. When the decision of the step 909 has proven that the engine is in the acceleration mode, an additional amount of fuel is injected at a step 910. The program then procedes to the macro processing 228 shown in FIG. 7.

In the foregoing, it has been assumed that all the angles $\theta_{EGI}$, $\theta_j$ and $\theta_{SPARK}$ are given in terms of the rotation angle from the reference crank angle. It should however be noted that the time $t_\theta$ required for reaching a given crank angle $\theta°$ from the time point at which the reference angle (0°) signal is generated can be easily determined in accordance with $t_\theta = k \theta/N$ where N represents the engine rotation speed and k represents a constant. In this way, it is also possible to determine the required timings in terms of time for performing the fuel injection control according to the present invention.

In the case of the embodiment described in the foregoing, the maximum instantaneous intake air flow velocity, i.e. the maximum peak of the intake air flow rate is directly determined. However, the maximum instantaneous intake air flow velocity may equally be determined in an indirect manner by detecting the minimum instantaneous intake air flow velocity or the minimum peak of the intake air flow rate and regarding a phase position shifted from the detected minimum velocity for a predetermined crank angle (or predetermined time) as the time point at which the instantaneous intake air flow velocity becomes maximum.

Figure 15:
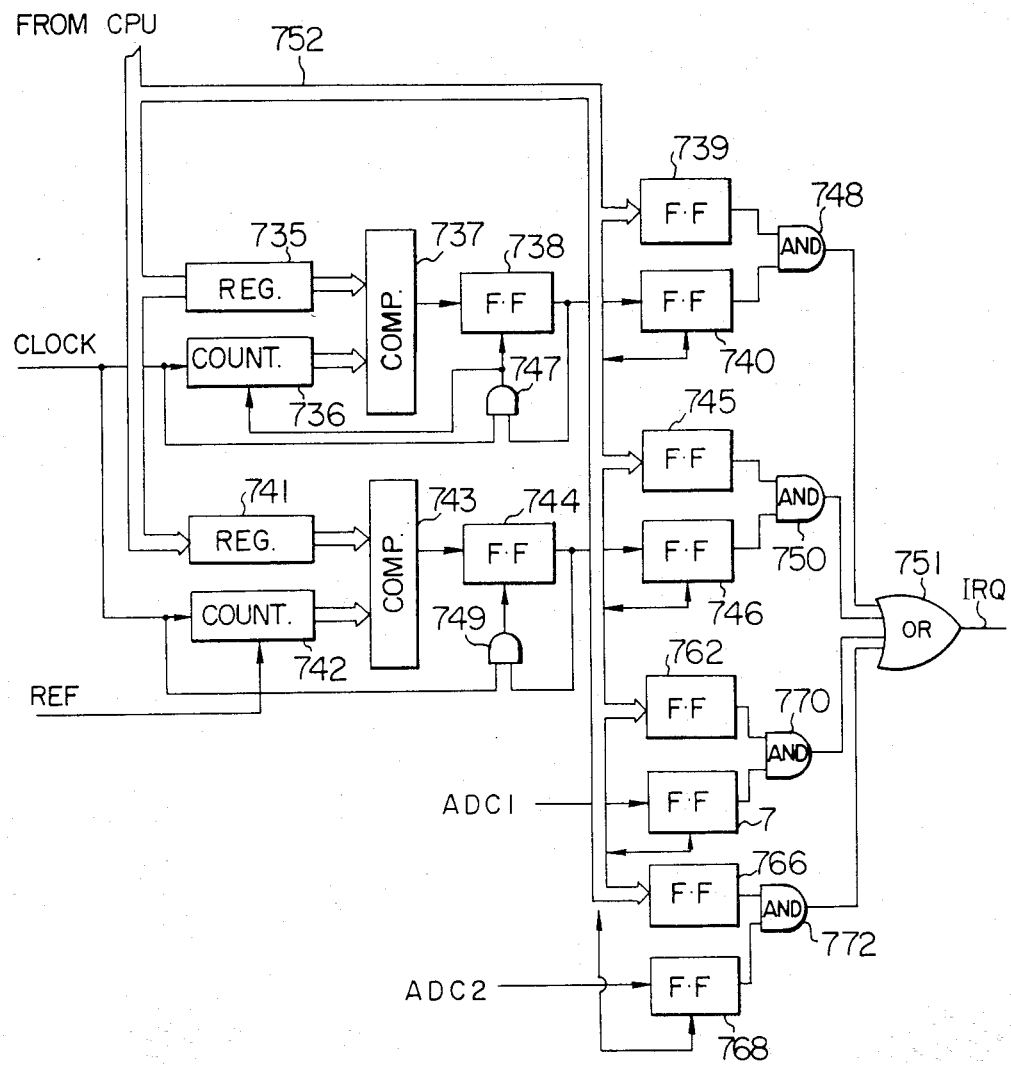
FIG. 15 is a schematic circuit diagram showing an interrupt request (IRQ) generating circuit.

FIG. 15 shows a circuit for generating the interrupt requests or IRQs. A register 735, a counter 736, a comparator 737 and a flip-flop 738 constitute a circuit for generating the INTV IRQ, wherein the periodical interval (e.g. 10 ms in the case of the illustrated embodiment) at which the INTV IRQ is issued is set at the register 735. On the other hand, the counter 736 is loaded with clock pulses. When it is detected by the comparator 737 that the counted value of the counter 736 coincides with the content of the register 735, the flip-flop 738 is set. In the set state of the flip-flop 738, the counter 736 is cleared for allowing it to count again the clock pulses. In this way, there are generated the INTV IRQs at the predetermined time interval (e.g. 10 msec).

A register 741, a counter 742, a comparator 743 and a flip-flop 744 constitutes a circuit for generating the ENST IRQ for detecting the stoppage of the engine. The register 741, the counter 742 and the comparator 743 operate in the similar manner as those 735, 736 and 737 mentioned above to generate the ENST IRQ when the count value of the counter 742 coincides with the content of the register 741. However, since the counter 742 is periodically cleared by the REF pulses generated by the crank angle sensor at every predetermined crank angle so long as the engine is rotated, the count of the counter 742 will never attain the value placed in the register 741, resulting in that no ENST IRQ is issued.

The INTV IRQ generated by the flip-flop 738 and the ENST IRQ generated by the flip-flop 744 as well as the IRQs generated through the ADC 1 and ADC2 are set at flip-flops 740, 746, 764 and 768, respectively. Further, a signal for permitting or inhibiting the generation of IRQs are set at flip-flops 739, 745, 762 and 766. More specifically, when a signal of "H" level is set at these flip-flops 739, 745, 762 and 766, respectively, AND gates 748, 750, 770 and 772 are enabled, whereby IRQ as generated is immediately outputted through an OR gate 751.

In other words, by placing the signal of "H" level or "L" level in the flip-flops 739, 745, 762 and 766, it is possible to permit or inhibit the generation of the IRQ. Further, by fetching the contents set at the flip-flops 740, 746, 764 and 768 by the CPU upon generation of IRQ, the cause or origin for which the IRQ is issued can be determined.

When the CPU begins to execute the relevant program in response to the generated IRQ signal, the latter has to be cleared. Accordingly, one of the flip-flops 740, 746, 764 and 768 which is associated with the IRQ for which the relevant program is started to be executed is cleared.

As will be appreciated from the foregoing, it is possible according to the present invention to detect the maximum intake air flow velocity without fail by using a hot-wire flow sensor exhibiting a high-speed response, whereby the optimal fuel injection timing can be determined on the basis of the maximum intake air flow velocity for realizing the axially stratified charging of the air-fuel mixture, to attain an improved fuel consumption characteristic while severe requirements imposed on the exhaust gas can be met satisfactorily with torque being prevented from being lowered.

Further, according to the illustrated embodiment of the invention, the optimal fuel control for an internal combustion engine can be accomplished by virtue of such arrangement that the fuel injection is constantly carried out at the time at which the intake air flow velocity is maximum in consideration of difference in the intake valves and other components among different engines.

The present invention allows the fuel consumption characteristic to be improved without involving any degradation with regard to the torque characteristic and the properties of the exhaust gas.

We claim:

1. A fuel control apparatus for an internal combustion engine which includes at least one cylinder and an intake passage for introducing intake air into said cylinder through an intake valve, comprising:
   fuel supply means for supplying fuel to said intake passage of the internal combustion engine;
   sensor means for detecting flow velocity of the intake air in said intake passage to produce an output signal representative of said flow velocity;
   calculating means for responding to the output signal of said sensor means to arithmetically determine the amount of fuel to be supplied through said fuel supply means;
   peak detecting means connected to said sensor means for detecting a peak of the output signal of said sensor means; and timing control means connected to said fuel supply means, said calculating means and said peak detecting means for controlling on the basis of the output signal of said peak detecting means the timing at which the fuel supply through said fuel supply means is initiated.

2. A fuel control apparatus for an internal combustion engine according to claim 1, wherein said sensor means is constituted by a hot-wire type flow sensor.

3. A fuel control apparatus for an internal combustion engine according to claim 1, wherein said timing control means controls the timing for the initiation of the fuel supply in such a manner that the fuel supply effected through said fuel supply means is terminated in the vicinity of the maximum peak of the intake air flow velocity.

4. A fuel control apparatus for an internal combustion engine according to claim 1, wherein said peak detecting means includes sampling means for sampling the output signal of said sensor means.

5. A fuel control apparatus for an internal combustion engine according to claim 1, wherein said timing control means includes:
   means for detecting a predetermined reference crank angle of said engine to thereby produce a reference angle signal;
   means for determining a crank angle of said engine which corresponds to the peak detected by said peak detecting means;
   means for calculating a crank angle of said engine which corresponds to a fuel supply time of said fuel supply means on the basis of the results of the calculation made by said fuel amount calculating means; and
   means for calculating a crank angle intervening between said reference signal generation and said fuel supply initiation on the basis of the crank angle which corresponds to the detected peak and the crank angle which corresponds to said fuel supply time.

6. A fuel control apparatus for an internal combustion engine according to claim 1, wherein said timing control means includes:
   means for detecting a predetermined reference angle of said engine to thereby generate a reference angle signal;
   first means for calculating a time intervening between the generation of said reference angle signal and the peak detected by said peak detecting means;
   second means for calculating a fuel supply time of said fuel supply means on the basis of the result of the calculation made by said fuel amount calculating means; and
   means for determining a time interval intervening between the generation of said reference angle signal and the initiation of said fuel supply on the basis of the results of the calculations made by both of said time calculating means.

* * * * *